United States Patent [19]
Bonerb

[11] Patent Number: 5,944,470
[45] Date of Patent: Aug. 31, 1999

[54] FLEXIBLE BULK CONTAINER UNLOADER

[76] Inventor: Timothy C. Bonerb, P.O. Box 263, Greenland, N.H. 03840

[21] Appl. No.: 08/784,119

[22] Filed: Jan. 15, 1997

Related U.S. Application Data

[60] Provisional application No. 60/010,347, Jan. 16, 1996.
[51] Int. Cl.⁶ ................................................. B65G 65/23
[52] U.S. Cl. ........................ 414/421; 414/411; 222/166
[58] Field of Search ................................ 414/403, 411, 414/419, 421, 425; 222/166, 180, 181.1

[56] References Cited

U.S. PATENT DOCUMENTS

| | | |
|---|---|---|
| 2,040,157 | 5/1936 | Story et al. |
| 2,744,670 | 5/1956 | Bendot ................................ 222/166 X |
| 3,814,270 | 6/1974 | Murphy. |
| 4,056,423 | 11/1977 | Hughes ..................................... 156/356 |
| 4,449,880 | 5/1984 | Hartman ................................... 414/421 |
| 4,527,716 | 7/1985 | Haas et al. ............................... 222/83.5 |
| 4,669,950 | 6/1987 | St. Lawrence ....................... 414/411 X |
| 4,802,810 | 2/1989 | Gunn .................................... 414/421 X |
| 4,966,311 | 10/1990 | Taylor ................................. 414/403 X |
| 5,344,048 | 9/1994 | Bonerb .................................... 222/105 |

FOREIGN PATENT DOCUMENTS

| | | | |
|---|---|---|---|
| 273404 | 11/1989 | Germany ................................ 414/419 |
| 5294448 | 11/1993 | Japan .................................... 414/403 |
| 1525100 | 11/1989 | U.S.S.R. ................................ 414/419 |

*Primary Examiner*—James W. Keenan
*Attorney, Agent, or Firm*—Phillip E. Decker

[57] ABSTRACT

An improved unloader for rigid or flexible bulk material containers having a side-mounted discharge. In addition to a forward tilting feature, the improved method and apparatus may have any combination of the following: an hydraulic rear tilt feature, hydraulic dump feature, hydraulic bag massage system, inflation system for the container discharge, screw feeder operation and safety controls, pivoting discharge connection flange, or massage arm system.

6 Claims, 21 Drawing Sheets

FLEXIBLE BULK CONTAINER UNLOADER

This application claims the benefit of U.S. Provisional Application No. 60/010,347, filed Jan. 16, 1996.

BACKGROUND

1. Field of the Invention

The invention relates to an apparatus and method for unloading dry, semi-dry, or wet materials stored in flexible and rigid bulk containers.

2. Description of the Related Art

Many of the bulk materials being processed and transported in commerce have proven to be difficult to handle. Materials that are easy to handle can be stored in silos or moved in rigid containers. Materials that are difficult to handle cannot, and present difficulty. A few examples of such materials are brown sugar, cheese curd, cellulose powder, chopped fiberglass, and pigments.

The problem with these materials is that they tend to compact over time due to the effects of vibration, moisture, and storage. Because of compaction and caking, the materials cannot be properly discharged from their containers. Furthermore, some materials are naturally resistant to flow. As a result, the material may bridge over the bottom discharge opening, thus interfering with the emptying of the container. The material may also rat hole, such that it forms a hole from the discharge opening to the top of the container which stops further material from flowing.

Although some bulk containers can be emptied by lifting them high in the air, this solution is undesirable. The process requires a great deal of vertical space and lifting equipment, and can be dangerous.

Another solution is to store and transport bulk materials in small sacks that are emptied by hand. This is undesirable because of the high labor cost involved and danger to personnel in the form of back injuries. Also, the one-shipment bag is destroyed in a single use.

Other materials may incompletely compact, such that a portion of the material remains like dust or powder. The problem with these materials is that some of the material may tend to flow even before the discharge is connected to its hopper.

One solution has been to employ a flexible, side-mounted discharge bulk container as taught in U.S. Pat. No. 5,344,048. A simple unloader is disclosed in that patent as well. The unloader disclosed in the patent is capable only of inclining the side-mounted discharge bulk container to assist in the unloading process. However, some materials require more aggressive handling before they can be properly discharged from a bulk container. A simple tilting procedure may not be sufficient in every circumstance to adequately discharge bulk materials, or to unload materials with poor flowing characteristics. Also, the unloader disclosed in that patent does not address the problem of partially un-compacted materials that flow too readily. A suitable unloader has not been found in the prior art.

Therefore, it is the object of this invention to provide an unloader for bulk material containers having a side-mounted discharge that employs active mechanisms that help un-compact compacted bulk materials.

It is another object of this invention to provide an unloader capable of preventing the flow of uncompacted material before the discharge has been secured to a hopper or other device.

It is another object of this invention to provide an unloader that employs at least one of many possible mechanisms for manipulating a bulk container and mechanisms for their automatic or manual control. What is needed is an unloading apparatus that is capable of unloading extremely compacted bulk materials and bulk materials that are only partially compacted.

SUMMARY

The invention is an unloading apparatus that satisfies these needs. The unloader can employ a rear tilt mechanism and restraint mechanism that permits tilting in the direction opposite the discharge so that uncompacted material will not flow out of the discharge before it is connected to a hopper. The unloader may also employ mechanisms for squeezing or massaging the sides of a side discharge bulk container to assist the un-compacting process. The unloader may also employ mechanisms for holding or manipulating the side-mounted discharge to assist the flow of material. The mechanisms can be manually or automatically controlled, and use hydraulics, pneumatics, or electric devices. These and other advantages and benefits will become apparent in the following drawings and description.

DETAILED DESCRIPTION

In accordance with the present invention, unloader embodiments can be provided with any combination of the operating systems disclosed herein to ensure that it will be capable of effectively handling and discharging a wide variety of materials. Some of the materials include brown sugar, carbon fiber, cellulose powder, chopped fiberglass, and pigments. In almost all cases, only one or two of the systems will be used for a specific application.

When selecting unloader features for specific applications, the appropriate control systems and logic circuits will also be chosen. As part of the overall hydraulic, pneumatic, or electro-mechanical package, some systems will require automatic operation, using solenoid valves and PLC's, as well as manually controlled valves. One will not be limited to having only automatic or manual controls. The manually operated overrides will give this capability. The selection of the controls and particular features needed for a particular embodiment is within the ability of a person having ordinary skill in the art.

Figure 1:
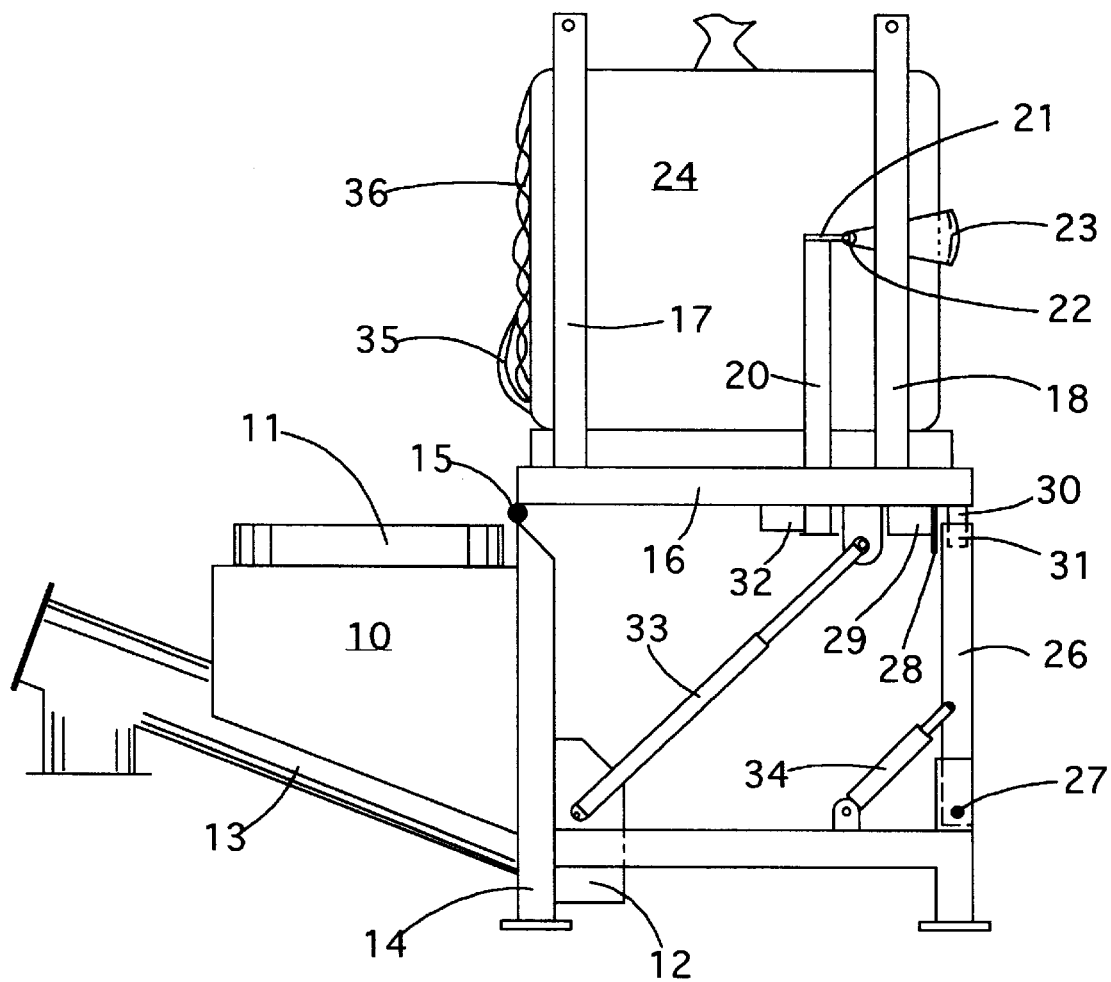
FIG. 1 is a side view of an unloader arrangement with a hydraulic rear tilt feature.

Turning to FIG. 1, there are several characteristics that are common to each embodiment of the unloader apparatus. A substantially rigid platform 16 is provided that is preferably rectangular in shape and sufficiently large to accept a standard sized pallet 25 that supports a bulk material container 24 and other unloader structures. The footprint of the container 24 is approximately the same as the load area of the pallet 25, and is typically shaped approximately like a cube. In the preferred embodiment, the unloader is adapted to unload side-mounted discharge bags as disclosed in U.S. Pat. No. 5,344,048, although the apparatus may also be used to unload rigid containers and containers without side-mounted discharge mechanisms, e.g., spouts 35. Such bags may also employ pleats 36 that expand the volume of the bag when fastened from the side of the bag.

Flexible bags 24 are often provided with straps at the top corners which, when used when the bulk material unloader of the present invention, help to hold the bag 24 in place on the platform during the unloading process. To that end, at least one front and back vertical support post 17 and 18 are provided and are secured near the four corners of the platform 16, and are spaced widely enough apart to permit loading a pallet 25 onto the platform 16. The support posts 17 and 18 are at least as tall as the bag, and may also employ strap securing mechanisms at their top ends, like hooks and bars.

The platform 16 rests on a substantially rigid frame 14, and may optionally be fastened to the frame on one side by a hinge 15 depending upon the particular embodiment. The frame 14 serves as a fastening mechanism to secure any of the unloading mechanisms described below, and is preferably made of structural steel.

An optional feature to any of the embodiments described below is the use of a screw feeder assembly 13 secured to a front end of the unloader frame 14. The screw feeder assembly has a hopper 10 having a flange 11 for attaching the bag spout 35 for receiving bulk material discharged from the bag 24. The screw feeder is driven by a motor 12, and moves material from the hopper to a suitable input point of an industrial process. Although a screw feeder is shown, other material conveying mechanisms may be used, including belt conveyors and bucket conveyors. Their selection and use of these and other equivalent mechanisms is well known to those skilled in the art.

HYDRAULIC REAR TILT FEATURE

Certain materials may not always cake up into a solid mass when shipped in the inflatable bag. Some of the material may remain in a powder and flowable condition. Because the front pleat of the bag must be opened up to allow the spout of the bag to be connected to the inlet flange of the unloader, the platform must be tilted backward to a sufficient angle so that no dust or material leaks out of the bag during this operation. Hazardous materials like herbicides, lead powder, fertilizers, and chemicals, as well as non-hazardous materials that may be dusty or require being handled in a contaminant-free environment, will require this feature. It is not possible to secure the spout of the bag to the inlet flange of the hopper without opening the sidewall pleat on the bag for diameters above around 50 cm. The spout is just too big.

Figure 2:
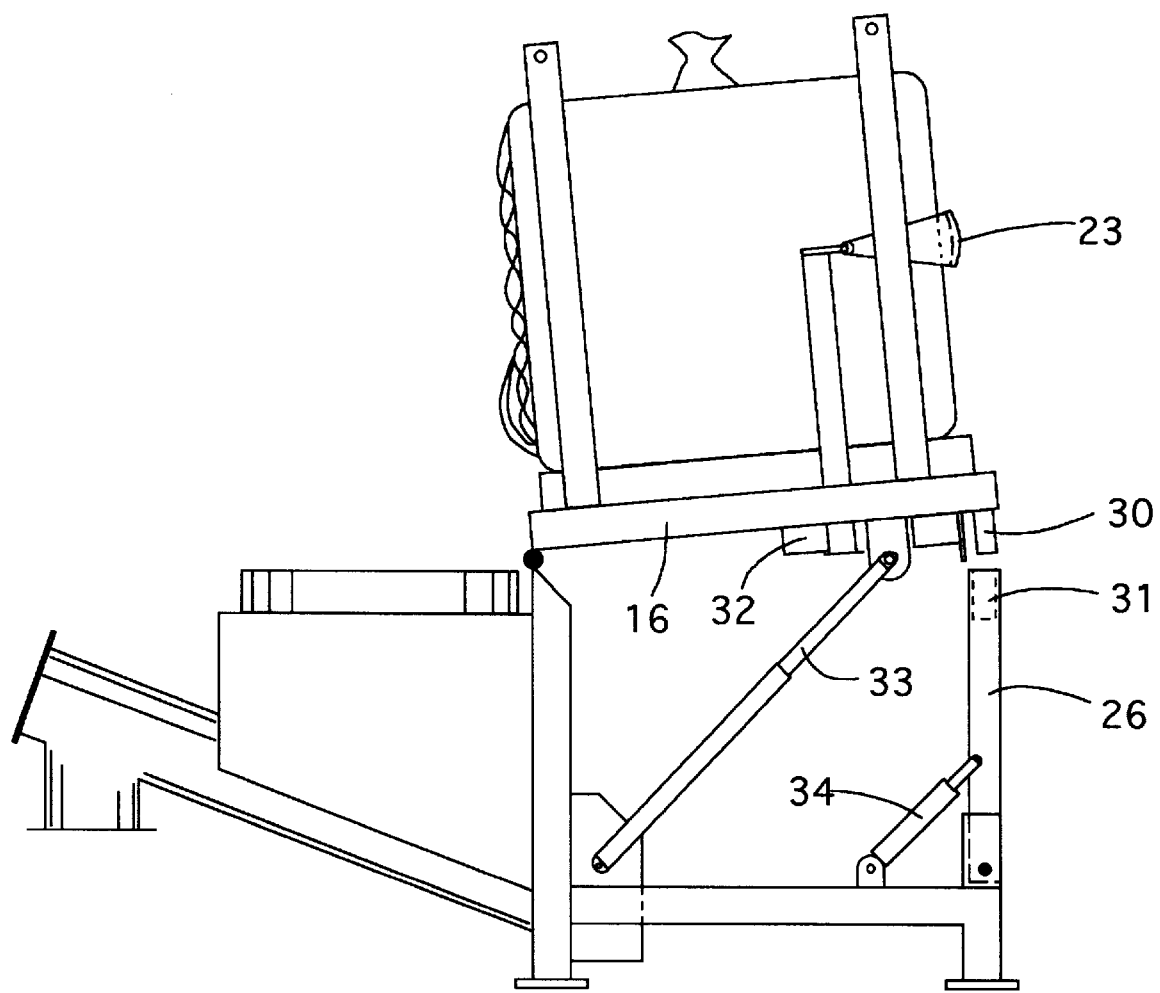
FIG. 2 illustrates the start of the rear tilt sequence in which the support platform is raised above the rear support frame.

Referring to FIGS. 1–4, this function is preferably controlled automatically with the press of a button. Referring to FIGS. 1–2, prior to activating this system for the rear tilt feature, the operator must attach a bag restraint harness 23 around the back of the bag and secure it to the bag restraint coupling 21, which is secured to a bag restraint post 20 fixed to the platform 16, and pull the bag restraint harness 23 tight. The bag restraint coupling is preferably spring loaded. By pulling the harness tight, the bag restraint harness limit switch 32 is energized. If the bag restraint harness limit switch 32 is not energized, the rear tilt feature will not function. A light or some type of warning device may be used to inform operator of the situation. Use of the limit switch is a safety feature, and an unloader can be provided without it for manual control.

With the bag secured, the operator presses the "Down" button causing the following to occur: in FIG. 2, a linear displacement mechanism 33 will extend to its maximum stroke, about 3 cm above the elevation of a rear support frame 26. The rear support frame is not necessary for this invention, but may be provided as an option. As the bag platform 16 moves upward and holds its maximum height position, the platform studs 30 are clear from the rear frame support stud openings 31. The linear displacement mechanism 33 is preferably a hydraulic cylinder, but could also be a pneumatic cylinder, power screw, or other mechanism known to those skilled in the art.

Figure 3:
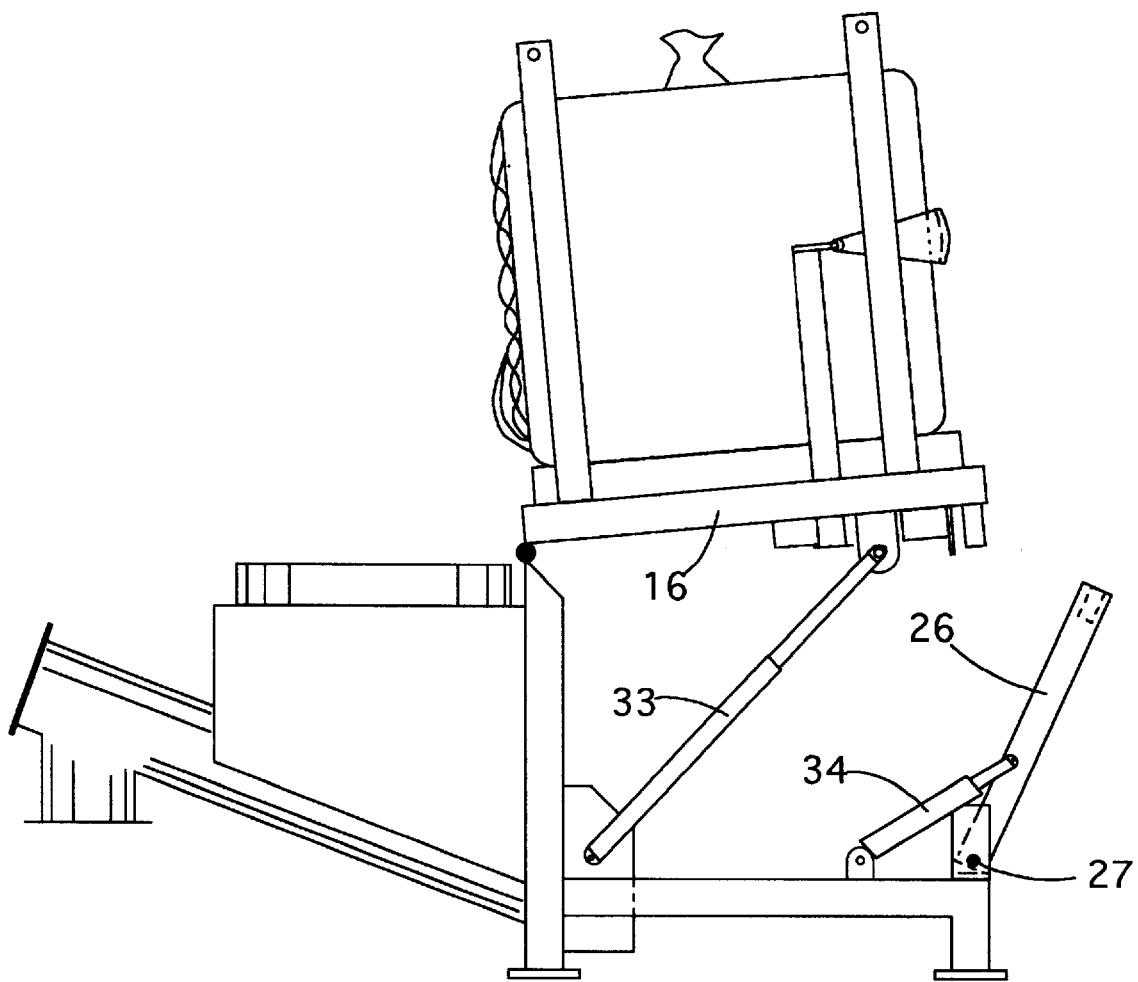
FIG. 3 shows the rear support frame moved out from underneath the support platform.

In FIG. 3, with the bag platform 16 remaining in a fixed position, a rear support frame hydraulic cylinder 34 extends to its maximum stroke causing the rear support frame 26 to tilt backwards as it pivots on the rear frame support pivot pin 27. As above, the rear support frame hydraulic cylinder could also be a pneumatic cylinder or power screw mechanism.

Figure 4:
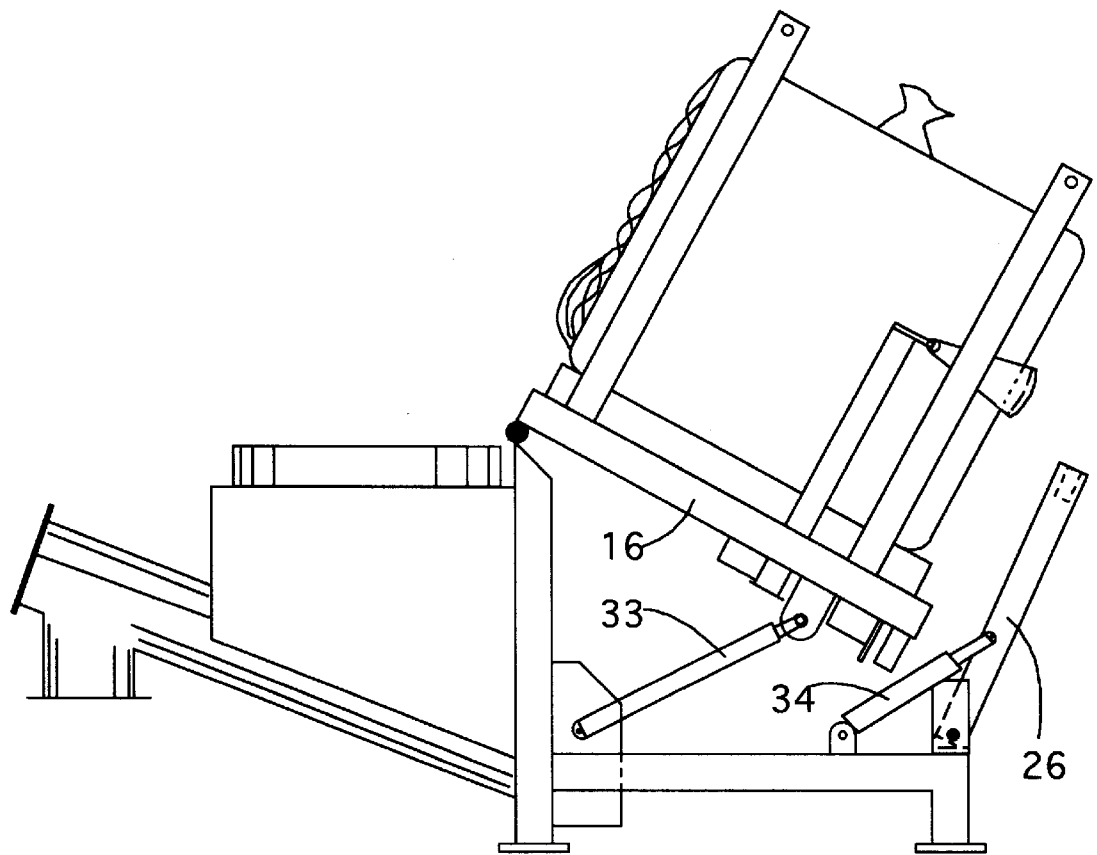
FIG. 4 shows the bulk container tilted in the direction opposite the discharge mechanism of the bulk container, and held in place with a restraint harness.

In FIG. 4, with the rear support frame 26 tilted back fully and in a hold position, the platform linear displacement mechanism 33 is activated to allow the bag platform 16 to tilt down and come to rest at the platform linear displacement mechanism's 33 minimum stroke position.

At this time, the operator releases the pleated sidewall of the bag 36 and secures the spout of the bag 35 to the inlet flange of the hopper 11, creating a dust-tight seal, according to FIG. 1.

With spout of the bag 35 secured, the contents of the bag 24 are ready to be discharged as soon as the bag platform 16 is moved back to its horizontal position. Referring to FIGS. 1–4, in reverse order, the following occurs by pressing the "UP" button:

In FIG. 4, the platform linear displacement mechanism 33 extends to its full stroke position, raising the bag platform 16 about 3 cm above its horizontal or rest position.

In FIGS. 3 and 1, the rear support frame linear displacement mechanism 34 retracts, moving the rear frame support 26 back to its vertical position. As the rear frame support 26 is positioned vertically, it comes to rest against a platform stop 28 and energizes a rear support frame limit switch 29. With the rear support frame limit switch activated, the platform linear displacement mechanism 33 can begin to retract so that the platform 16 will come to rest on the rear support frame 26. As this occurs, platform studs 30 interface with rear support frame stud openings 31 to lock both frames into position.

In some embodiments, just prior to, and during, any movement of the system, an alarm device should be used to alert people in the area. An alarm beeper similar to the type used on a fork truck may be desirable. The rear support frame also acts as a safety guard for the bag when the platform is in the down position. Emergency stop buttons may be employed to stop and hold components in place when activated. Manual valve overrides may not be necessary. The "Down" function is preferably completed in 15–24 seconds, and the support frame linear displacement mechanism 33 may be double-acting.

HYDRAULIC DUMP FEATURE

For materials that have severe caking problems, it may be necessary to use a bag having an inflatable liner. However, since all of the material may not be discharged by inflation means only, the platform may also have to be inclined to dump the material remaining in the bag.

To use the dump function, the static end of the platform linear displacement mechanism 33 will be repositioned on the unloader frame 14. The rear support frame linear displacement mechanism 34 will be rendered inoperable, or removed completely, and the rear support frame 26 will be locked or bolted in a fixed vertical position. If the unloader frame 14 and linear displacement mechanism 33 are made strong enough, the rear support frame 26 may be removed. The minimum stroke of cylinder 33 would need to locate the bag platform 16 in the horizontal position. As with all the linear displacement mechanisms described in this disclosure, a linear displacement mechanism can be a hydraulic cylinder, pneumatic cylinder, or power screw mechanism.

Figure 5:
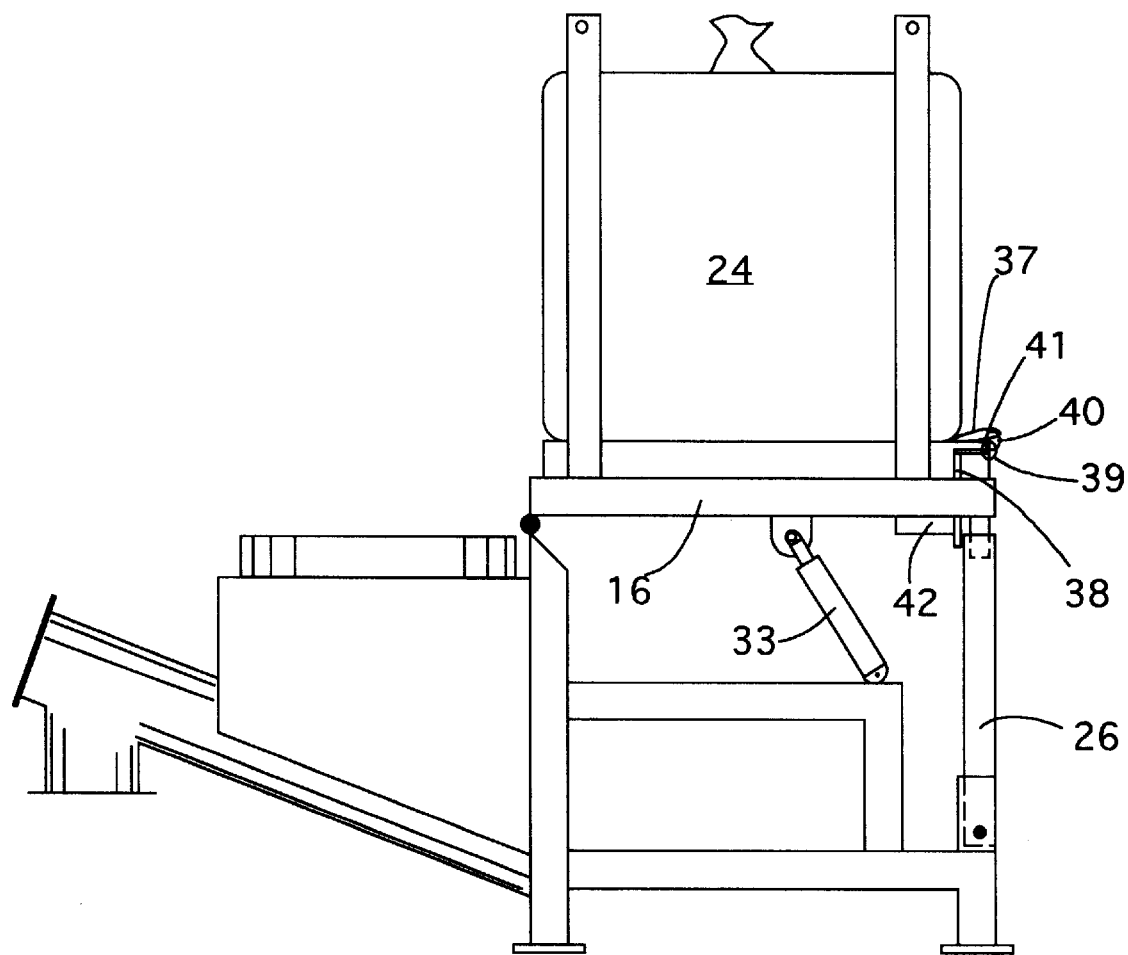
FIG. 5 is a side view of an unloader arrangement with a hydraulic dump feature, and a bulk container held in place with restraint loops and restraint cables.

In FIG. 5, before the "UP" manual lever control can be used, the bag 24 must be secured on the bag platform 16 so that it does not slide forward as the dumping cycle begins. The bag 24 is equipped with cable restraint loops 37. The operator passes the free end of a restraint cable 41 through the restraint cable loops 37 that are affixed to the back of the bag 24. One end of the restraint cable 41 is permanently secured to the side of the bag platform 16. The other end of the restraint cable 41 is equipped with a cable coupling ring 40. With a restraint cable 39 passed through the restraint cable loops 37 of the bag 24, the operator then attaches the cable coupling ring 40 of the restraint cable 41 to a cable restraint post 38. As the operator pulls the restraint cable 41 tight, a restraint cable limit switch 42 is activated. The restraint cable limit switch 42 must be activated for the dumping controls to be used. This is a safety feature of the dumping system. The top bag loops also offer a level of safety in holding the bag on the platform.

Figure 6:
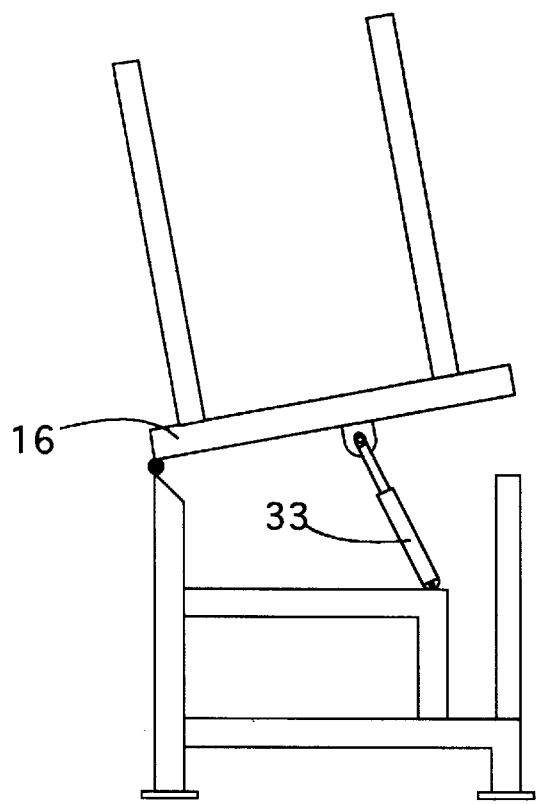
FIG. 6 shows the hydraulic dump feature arrangement at the start of platform inclination.
Figure 7:
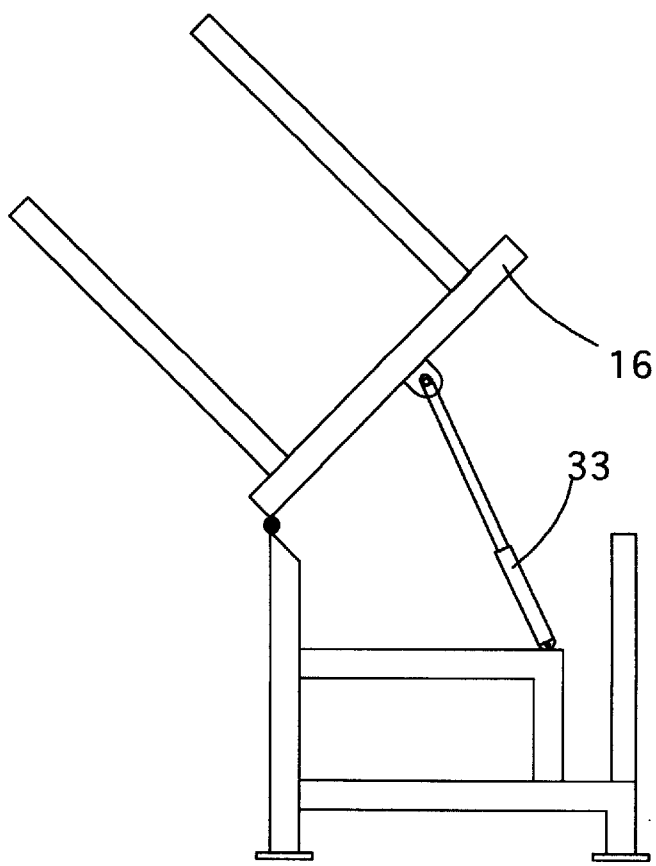
FIG. 7 shows the hydraulic dump feature arrangement at approximately maximum inclination.

In FIGS. 6 and 7, for this function, the operation of the platform linear displacement mechanism 33 may be operated by manual lever controls, or may be automatic. In the majority of situations, the material remaining in the bag will be discharged into the unloader's hopper by simply inclining the bag platform 16. The operator may want to "dump" the contents of the bag incrementally or all at once. An "UP" lever will control the dumping action and a "Down" lever will allow the platform linear displacement mechanism 33 to retract, lowering the bag platform 16 to its horizontal position. The linear displacement mechanism needs to be single acting for the up motion only.

In this embodiment, while the bag platform is at its maximum incline position, it is actually balanced because of the counterweight effect of the bag support posts. While not wanting to make the linear displacement mechanism double-acting, a spring means may be necessary to exert some resistance to get the platform moving back down until gravity takes over. In other embodiments, the other control systems need to be locked out, or a flow valve will control the speed of the linear displacement mechanism.

HYDRAULIC BAG MASSAGE SYSTEM

Materials that are hydroscopic, cohesive and otherwise subject to compaction and caking often require a flow-aid device to induce material flow. With the pleat and spout of the bag open, thus increasing the volume inside, the material in the bag has a place to move to as exterior force is applied to its sidewalls.

Because the volume inside a conventional bag cannot be increased, squeezing would only compact the material further. It is not a solution. The following example of discharging a load of compressed garbage from a garbage truck clearly illustrates the concept of "increased volume." When the rear door is open, the ram is able to push the material out since the open rear door effectively increases the volume of the container. When the rear door is closed, the ram will only compress the load further.

As stated above, by applying an exterior force to the sides of the bag, with the pleat open and interior volume increased, the material inside can be fractured, moved and forced toward the discharge outlet of the bag. A movable or fixed framework equipped with linear displacement mechanisms will provide inward force to the sides of the bag. By changing the direction and length of the stroke, push angles and end fixtures, an almost infinite number of options are available. It is important to note that while some materials are similar in nature, most have unique properties. Each requires special consideration.

Figure 8:
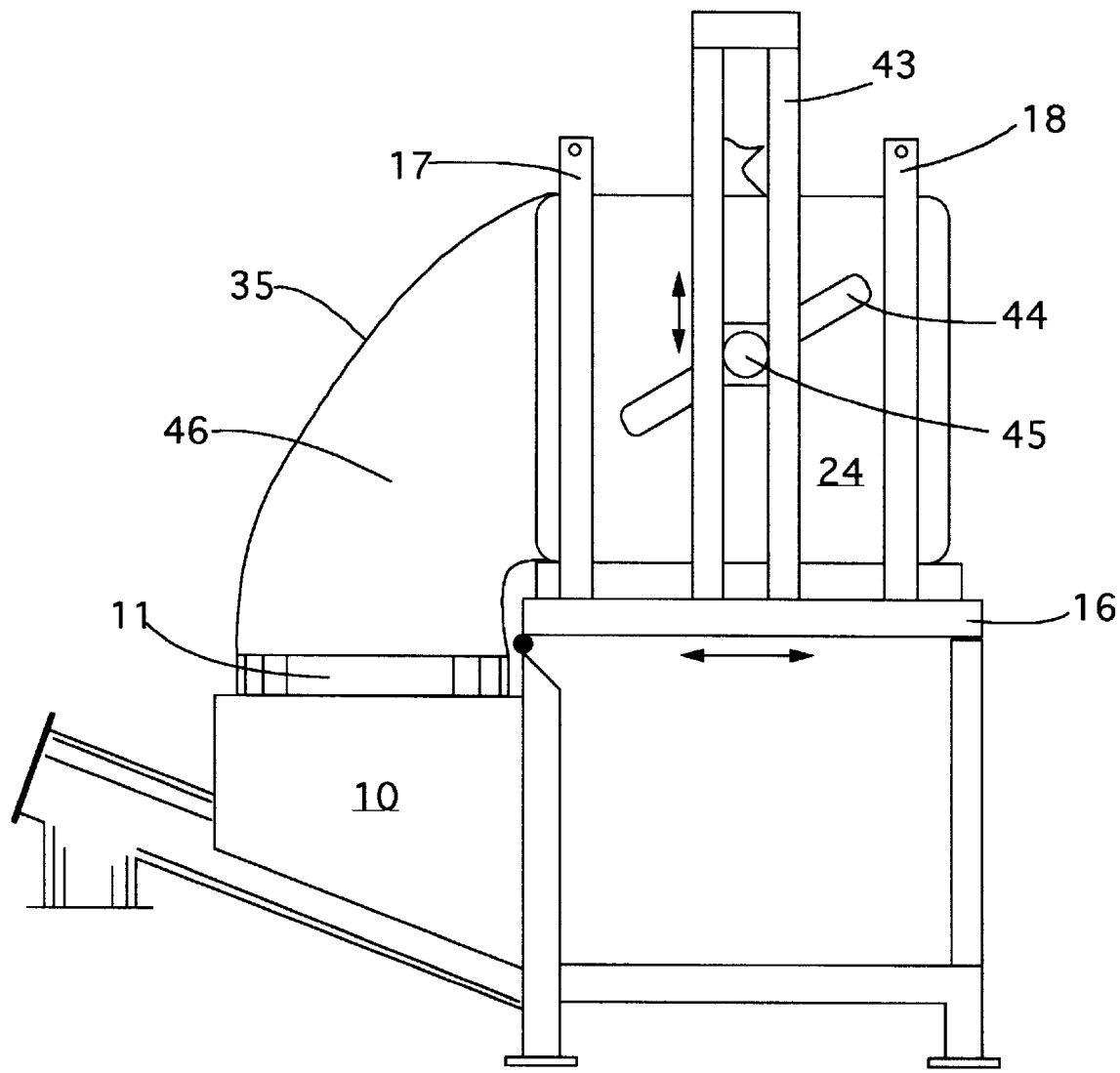
FIG. 8 is a side view of an unloader arrangement with a hydraulic bag massage system.
Figure 9:
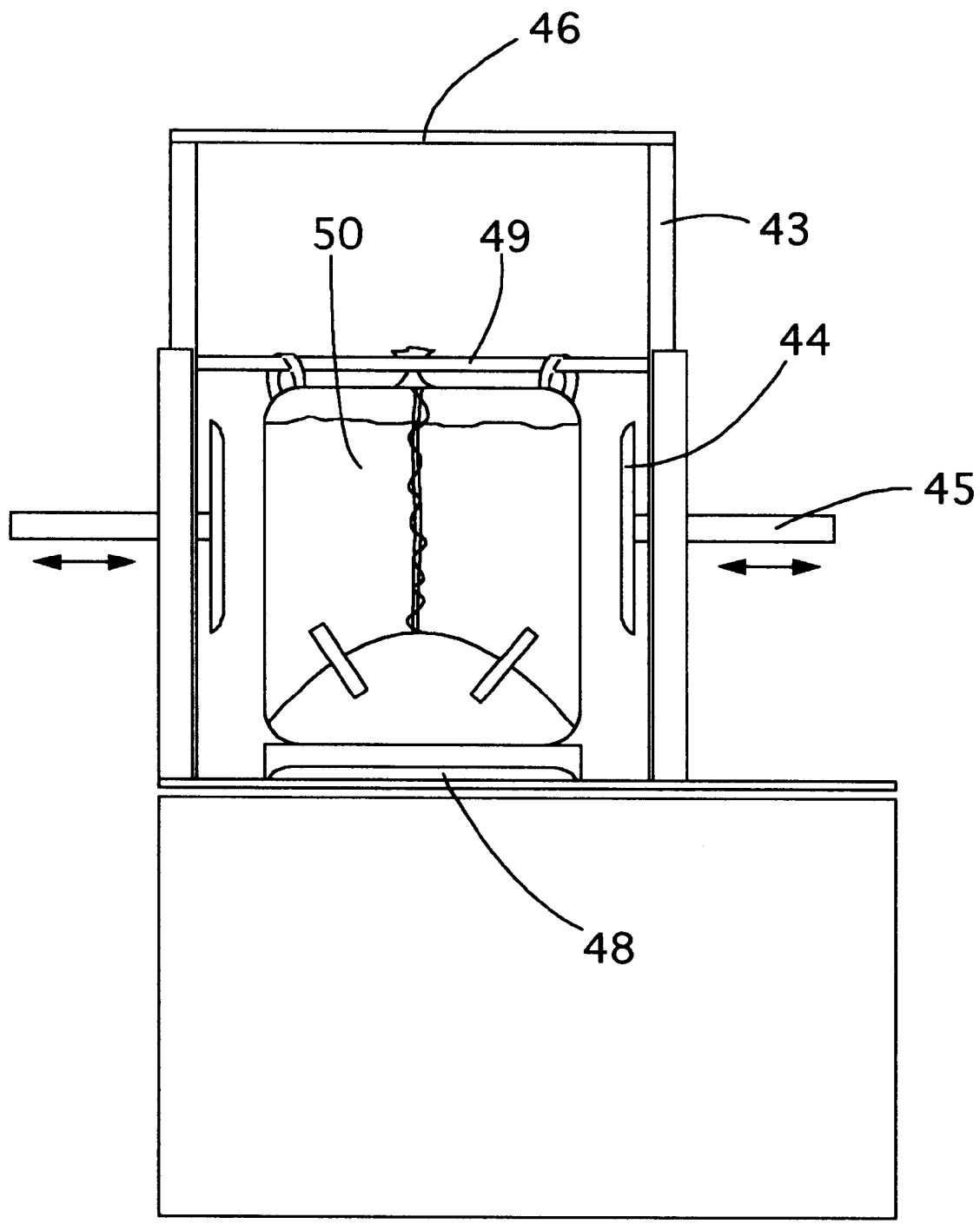
FIG. 9 is an end view of an unloader arrangement with a hydraulic bag massage system.

In FIGS. 8 and 9, the bag massage system is to be operated independently of unloader features, and it should normally be operated when the bag platform 16 is in the horizontal position. As a result of the operator securing the spout of the bag 35 to the inlet flange of the hopper 11, the volume increase in the bag 46 will provide space for the material to move to as force is applied to the sides of the bag 24. Massage paddles 44 will exert pressure to the sides of the bag 24 as the massage linear displacement mechanisms 45 are activated. The bag massage frame 43 is designed so it can be moved back and forth along the bag platform 16. Once in the desired location, it will be locked into position. The bag massage frame 43 is also equipped so that each vertical column can rotate, providing different push angles to the bag 24 as well as allow the massage linear displacement mechanisms 45 to slide up and down the vertical columns of the bag massage frame 43. The massage linear displacement mechanisms 45 may also be adjusted to alter their push angle from perpendicular to the side of the bag 24 to any oblique angle. Once at the desired elevation, each massage linear displacement mechanism 45 can be locked into that position. While the massage linear displacement mechanisms 45 push angle may be at right angles to the bag 24, it may be desirable to angle the massage paddles 44 inward towards the front of the bag 24 so that the material in bag 50 towards the hopper 10 will be acted upon first. The top bag loop restraint 49 shows how the top loops of the bag are suspended. This design allows the operator to attach all of the loops of the bag from only one side of the bag while standing on the platform.

Also, while holding the bag 24 up, the bag is free to slide and move along the top bag loop restraint 49 while the bag massage system is operating. Fixed top loop restraints could cause tears or other damage to the bag 24 if held too firmly in place.

FIG. 9 clearly illustrates how the inward movement of the massage linear displacement mechanism 45 and massage paddles 44 will push inward against the sides of the bag 24.

When using the bag massage system, referring to FIG. 1, the bag restraint harness 23 may be used to prevent the bag 24 from moving backwards as force is applied.

To provide the operator complete control over the bag massage system, each linear displacement mechanism should be controlled by a manual lever and independent of the other. Linear displacement mechanisms are preferably double acting to provide the required pushing and retracting action. Also, because the distance between the massage paddle 44 and the bag 24 will almost always differ between the two sides, the first massage paddle 44 to be operated will simply come to rest against the bag before applying pressure. It will be only after both massage paddles 44 come to rest against the sides of the bag 24 that one or both linear displacement mechanisms may be used, either in tandem or one at a time, that force may be applied. It is important that the bag remain stable and in the center of the paddle to its full stroke would result in moving the bag and possibly causing damage to the bag.

In one embodiment, the pushing speed should be adjusted for fairly slow movement so that no sudden jerks could damage the bag. The double inflatable liner bag design will reduce the need for this system (it will provide a more deliberate and targeted function from inside the bag). An alarm horn/beeper can be used with this system.

INFLATION SYSTEM FOR BAG DISCHARGE

The material in the bag may be caked and compacted to a point where it will not flow. To begin breaking it up and forcing it towards the hopper, low pressure air can be introduced between the sidewall of the bag and an interior liner. As air enters the space between the two, the interior liner expands. As it expands, the material begins to fracture and is eventually pushed towards the hopper. It is important that the entire brick of material is not discharged all at once. First of all, the hopper will not hold the volume, unless designed that way deliberately, but more importantly, it would create problems in the hopper and cause flow problems in the conveyor. The concept is to supply the hopper with small increments of material, just enough to keep the conveyor flooded so that no interruption in flow occurs. While flow-aid devices can be installed on or in the hopper to help agitate the material and keep it moving, low head pressure is ideal. It helps prevent flow problems from occurring. In the preferred embodiment, a low level sensor or probe installed in the hopper will constantly monitor the level of material over the conveyor. As the level drops below a preset level, a blower will come on, thus inflating the liner in the bag, until the probe detects the presence of material. The blower will go on and off many times in response to the probe until the contents of the bag are emptied. One embodiment can be equipped with two blowers. One will be dedicated for inflating the bag only, while the other will be used for other flow-aid devices, or use in tandem with the primary blower.

Figure 10:
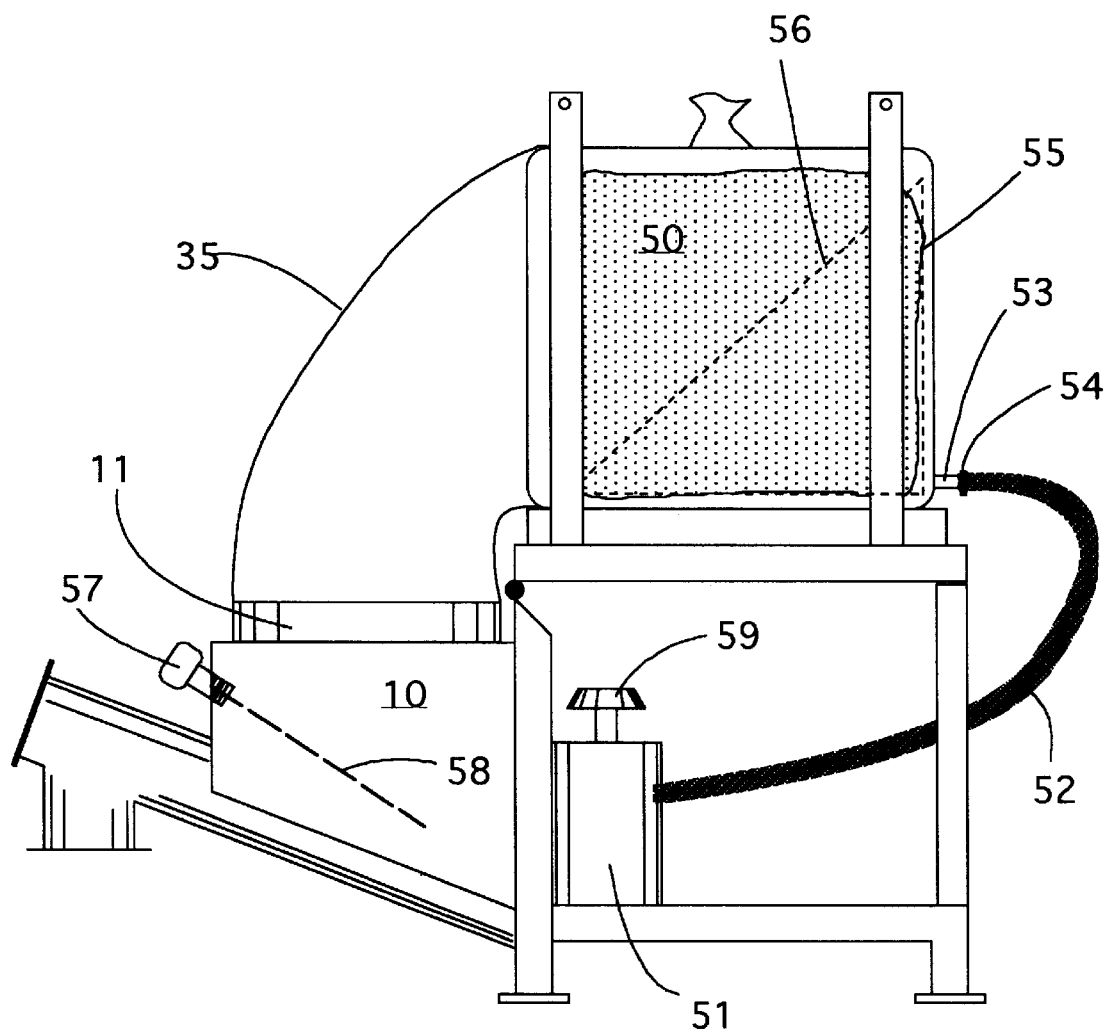
FIG. 10 is a side view of an unloader arrangement with an inflation system for bag discharge.
Figure 11:
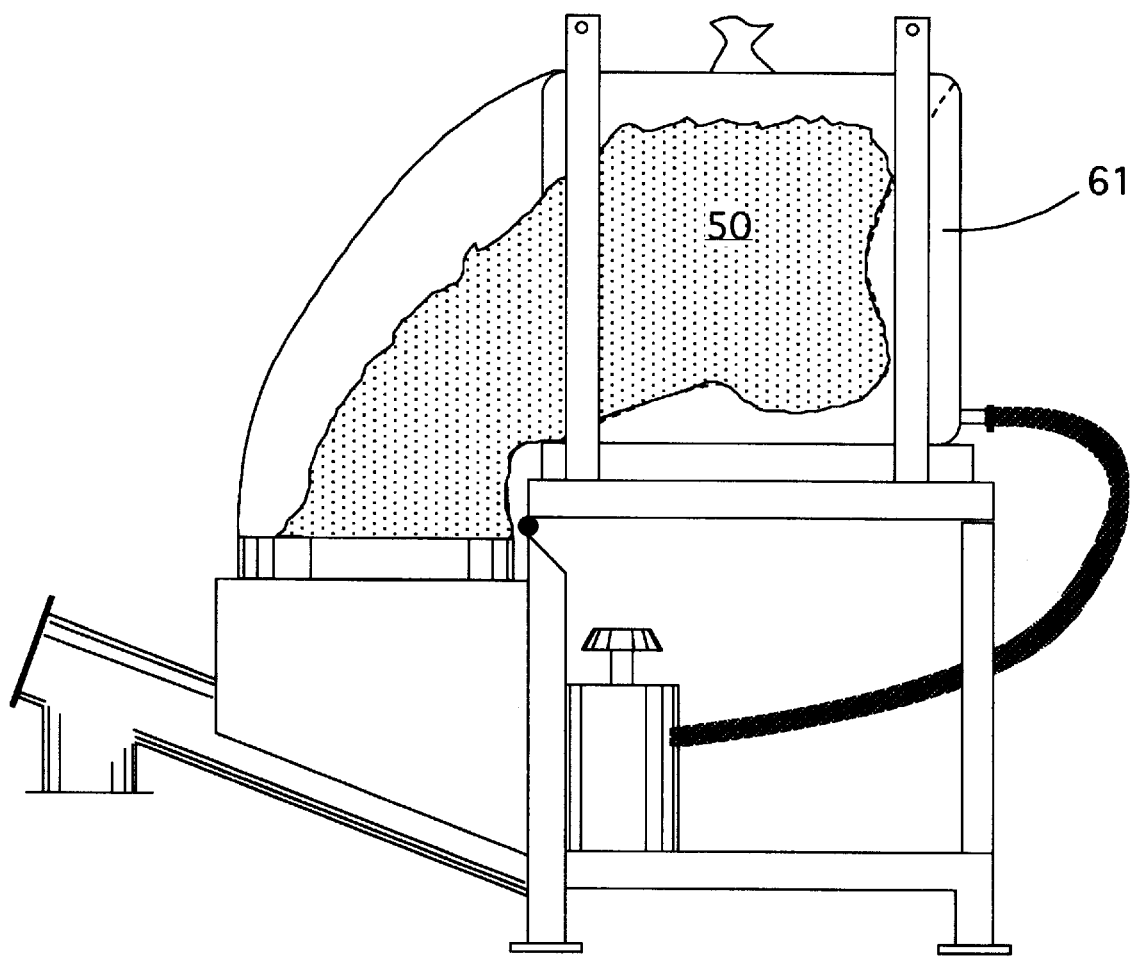
FIG. 11 shows the inflation system starting to inflate a bulk container.
Figure 12:
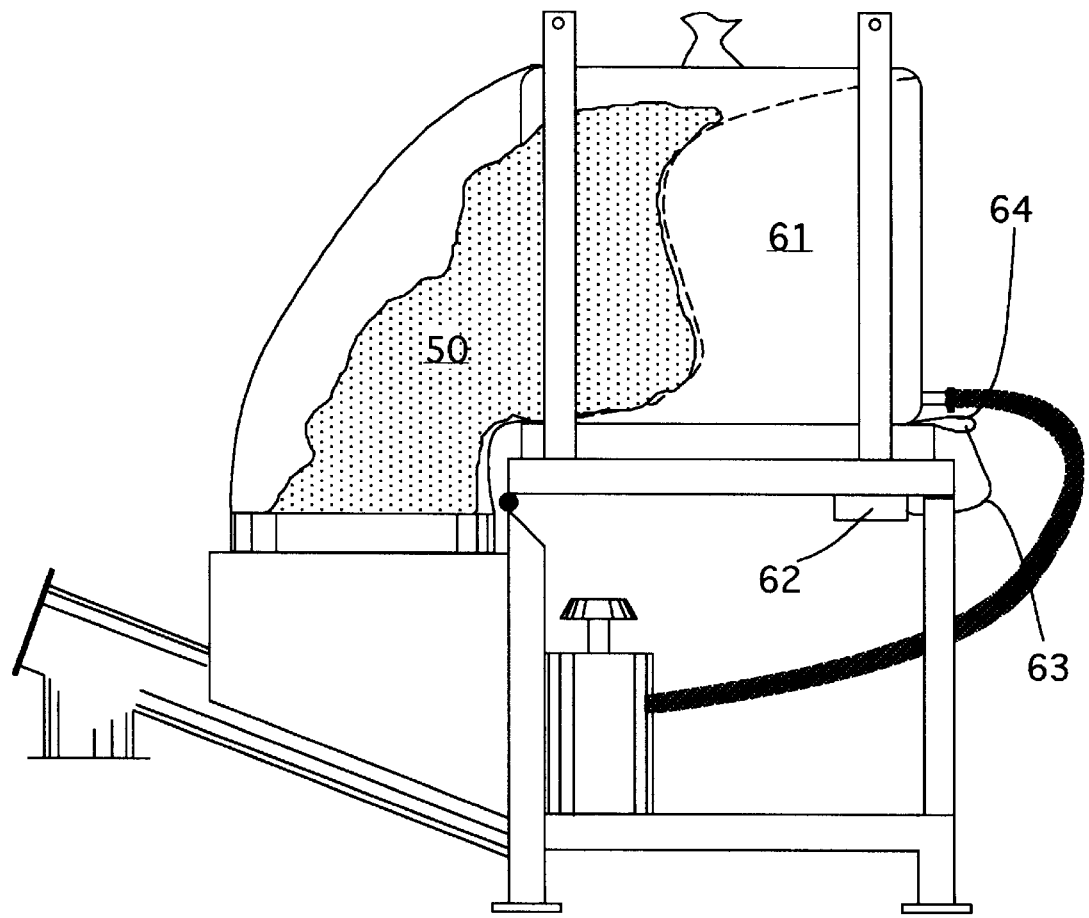
FIG. 12 shows the inflation system with control features for shutting off when the container is empty.

In one embodiment, shown in FIGS. 10–12, as soon as the operator has secured the spout of the bag 35 to the inlet flange of the hopper 11 and connected an air hose 52 to a bag air inlet tube 53 using a bag air inlet closure ring 54, the material 50 in bag may be discharged. Because the hopper 10 is initially empty, the probe 57 will sense that the material level needs to be replenished, and a blower system 51 will be activated immediately. As soon as a probe extension 58 senses that the material level in the hopper 10 is at the proper level, the probe 57 will switch the blower system 51 off. Each time the blower system 51 comes on, the air between bag wall and the liner 61 will increase in volume. The inflatable liner 55 will continue to expand, breaking up and pushing the caked material. The material being discharged 50 breaks up further as it falls into the hopper 10. An air filter 59 can be provided as a component of the blower system 51 to ensure the supply of clean air to the blower.

When the inflatable liner 55 is fully expanded signifying that the bag contents have been discharged and the bag is empty, the bag will tend to acquire a round shape as it nears full inflation and the corners of the bag 24 nearest the platform will rise above the platform. This rise will provide the automatic control system the means to turn the system off. An end clip 64 with a cable 63 will be attached to a back floor wall seam of the bag 24. As the bag 24 rises at full inflation, the cable 63 will pull inflation limit switch 62. A timer may also be used to turn off the blower. For example, if the blower runs constantly for more than one minute, the system shuts off. In any event, a maximum time limit will be part of the control system. If the blower were to be left on continuously the heat produced by the blower could become a serious hazard.

In one embodiment, the probe and blower system could be equipped with both automatic and manual controls. A single button pendant switch can be provided for jogging the blower during test and actual operating conditions The operator may monitor the first few inflation blasts to make sure the material is breaking up and beginning to flow. The automatic controls can be turned on once the operator determines the brick of material in the bag has been sufficiently fractured.

MATERIAL CONVEYOR OPERATION AND SAFETY CONTROLS

A potential hazard exists when a material conveyor is turning and the hopper is uncovered. In addressing this safety concern, a limit switch can be mounted on the inlet flange of the hopper that will sense the presence of either the cover or bag clamp ring.

Figure 13:
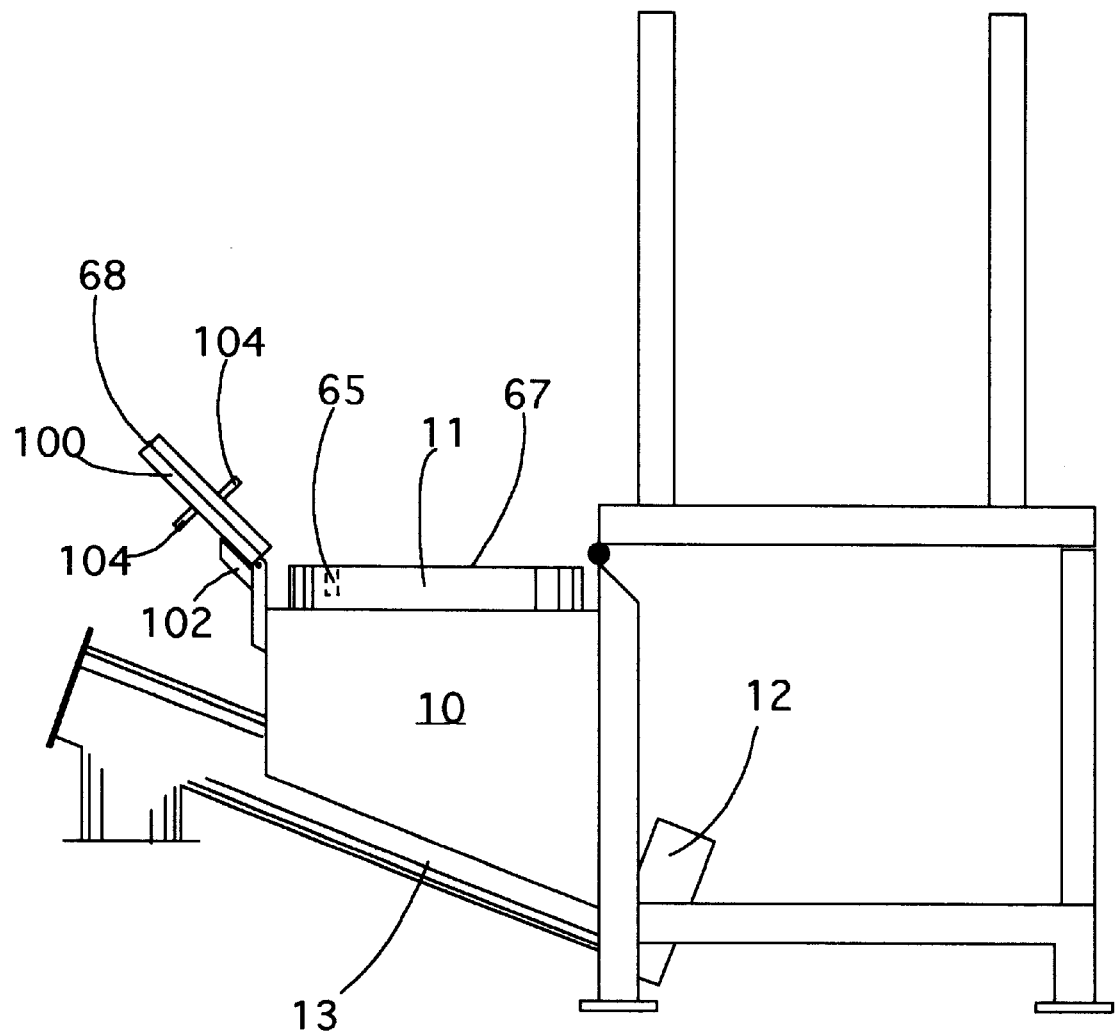
FIG. 13 is a side view of an unloader arrangement for screw feeder operation with safety controls.
Figure 14:
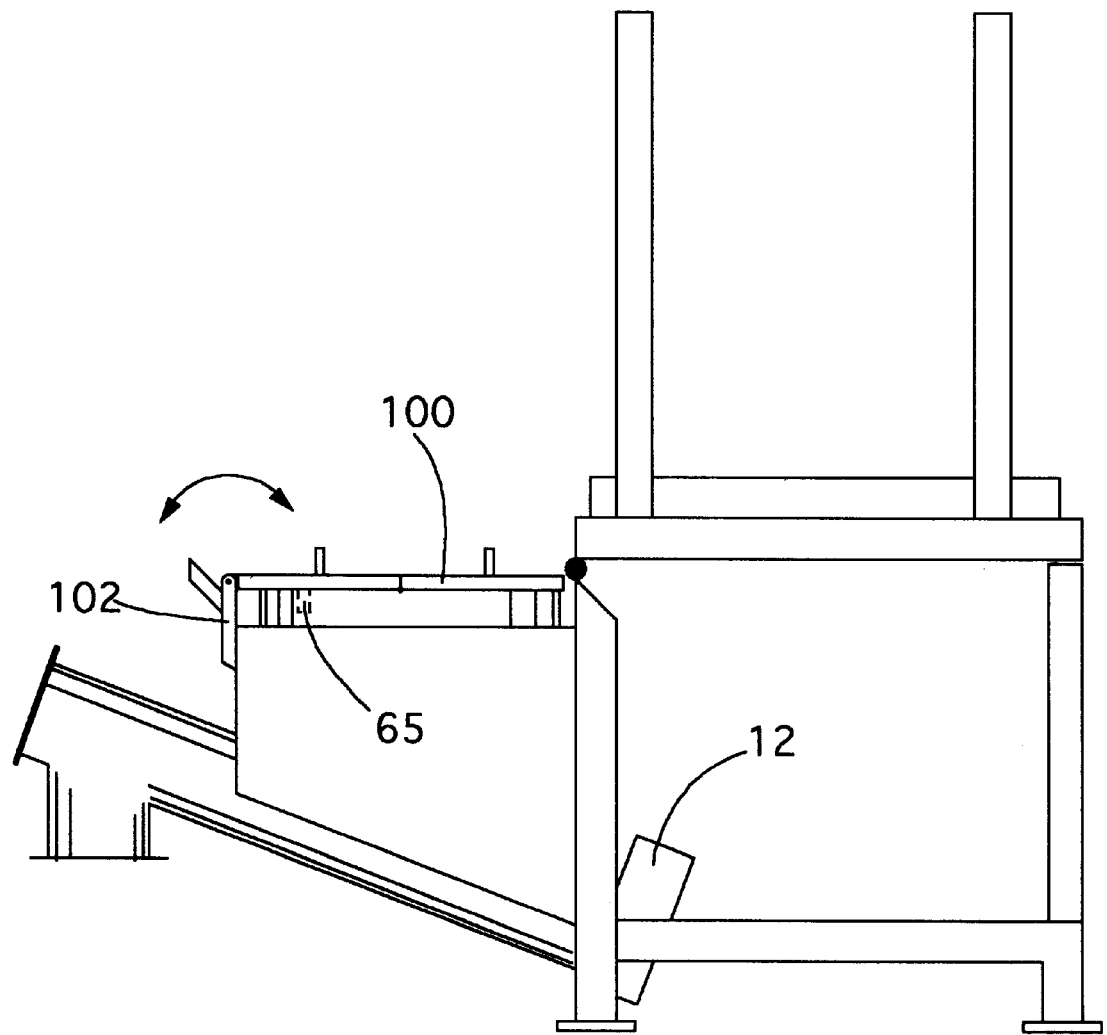
FIG. 14 shows the screw feeder arrangement with the hopper cover in place.
Figure 15:
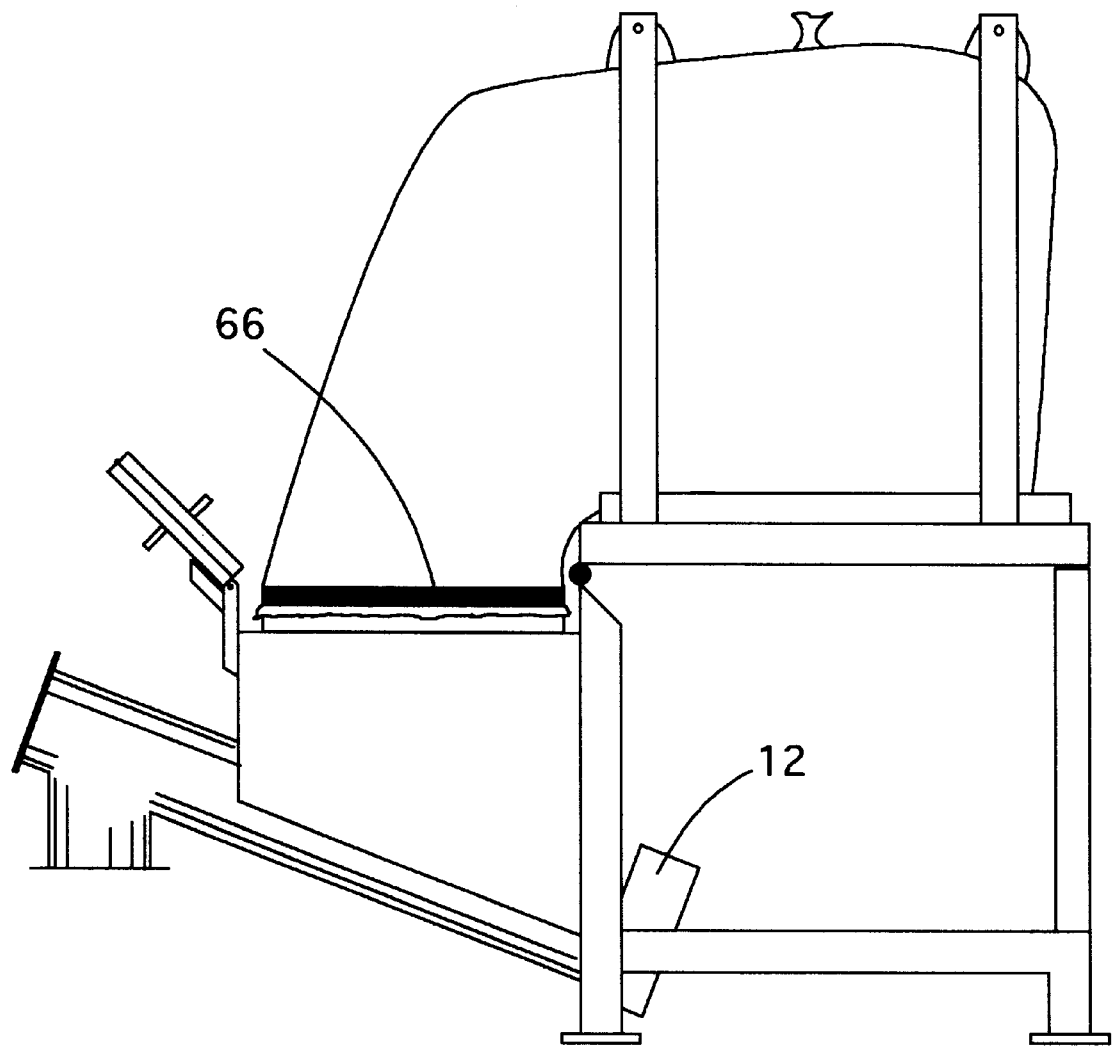
FIG. 15 shows the screw feeder arrangement with the bag clamp ring in place.

Although a hopper inlet opening 67 typically has several bars running across it from side to side, it remains a safety concern when uncovered. Referring to FIGS. 13–15, a hopper cover 100 is provided to allow the material conveyor to continue running, supplying material to production, when the bag 24 is not attached to the inlet flange of the hopper 11. Typically, an operator will need to change bags 24 and at the same time ensure that material in the hopper 10 is being fed to production. A hopper inlet opening limit switch 65 is positioned on the inlet flange of the hopper 11 and will sense the placement of either the hopper cover 100 or the bag clamp ring 66. If either the hopper cover 100 or the bag clamp ring 66 is not in place, the material conveyor 13 will not operate. The hopper inlet opening limit switch 65 will provide the means for controlling the material conveyor drive and motor 12 when the hopper opening 67 is uncovered. The hopper cover 100 is designed to be folded in half by a hinge 68 when in its stowed position at rest on a cover support frame 102. Handles 104 will allow the operator easy access and handling of the hopper cover 100. By folding the hopper cover 100 in half for stowage, the underside or contact surface is likely to remain clean and contaminant-free. Material dust from the hopper 11 will remain entrapped in the folded hopper cover 100. Also, by stowing the hopper cover 100 in a folded position, it is less likely to fall, causing injury to fingers, and other appendages, and provides easier handling with the two cover handles 104 provided. It also assumes a lower profile and is away from other components.

PIVOTING DISCHARGE CONNECTION FLANGE

Figure 16:
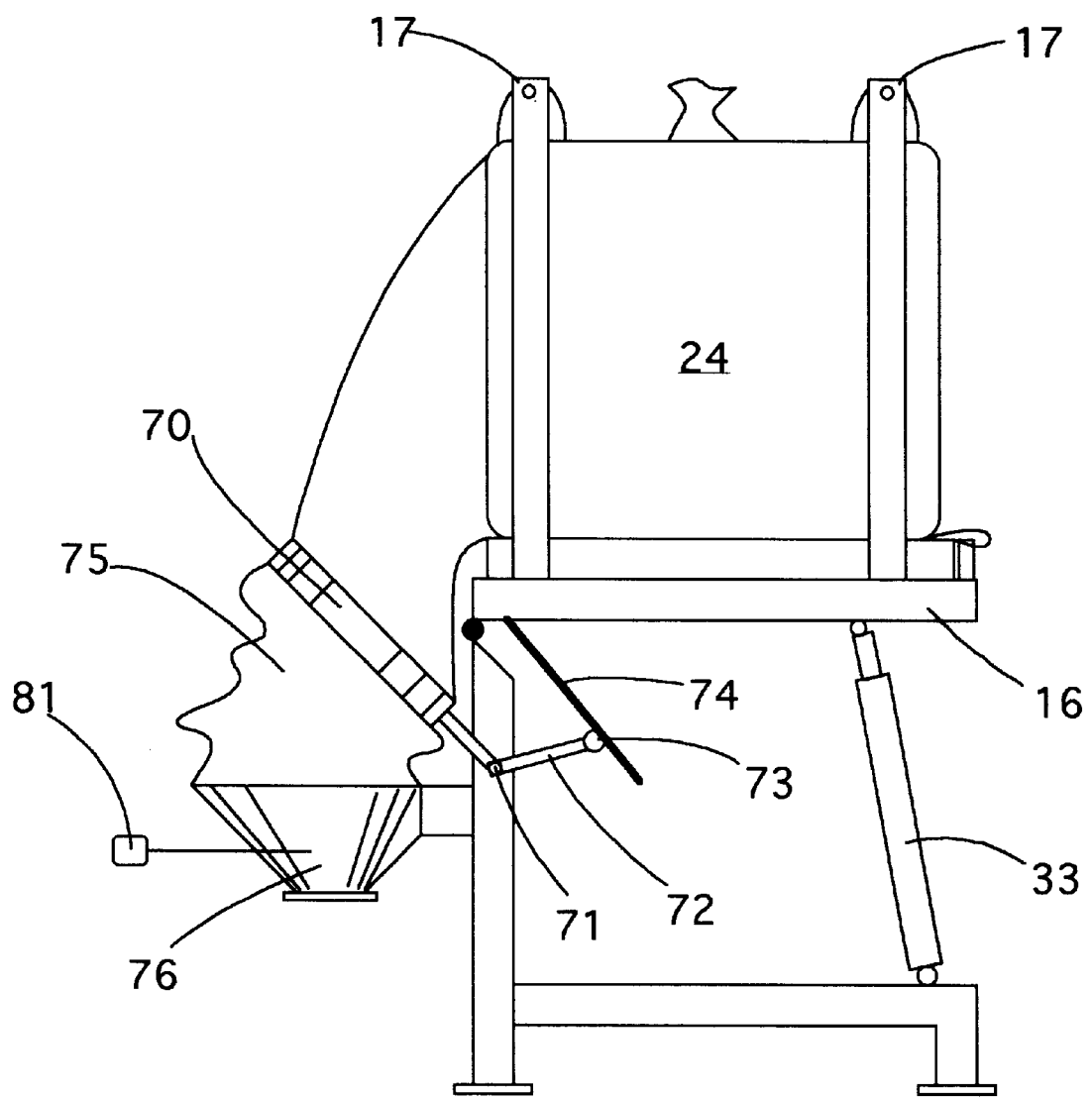
FIG. 16 is a side view of an unloader arrangement with a discharge connection flange that pivots downward as the support platform is inclined.
Figure 17:
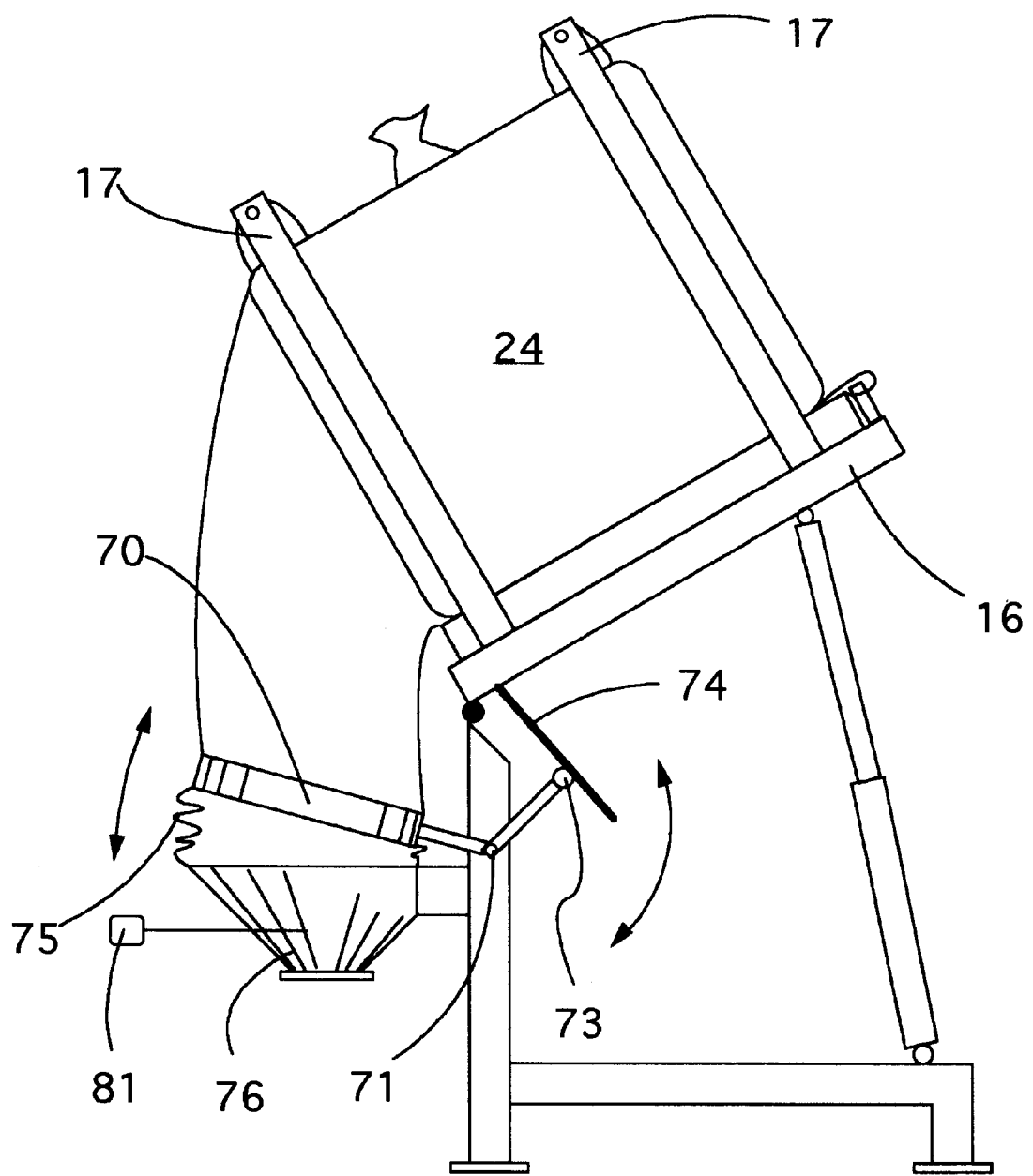
FIG. 17 shows the discharge connection flange pivoted downward when the support platform is inclined.

FIGS. 16–17 illustrate how a discharge connection flange 70 can be provided to pivot downward as the bag platform 16 is inclined. This feature ensures that the discharge spout of the bag 24 remains in an open and taut position during the dumping action of the unloader. The discharge connection flange 70 is not directly linked to the platform 16. A flange arm 72 is fixed to the discharge connection flange 70 so that it rotates at a pivot joint 71. In the preferred embodiment, a wheel 73 is fixed at the end of the arm 72 and rolls along a platform flange 74 as it moves up and down. Alternatively, the arm 72 can contact the platform flange 74 by sliding or even be rotatably connected as with a linkage. The movement of the platform 16 controls the movement of the discharge connection flange 70. The discharge connection flange 70 may be held in place or held upward, even though the platform 16 is moving. Gravity pulls the discharge connection flange 70 down, but is allowed to float so as not to cause injury.

A flexible housing 75 is connected between the discharge connection flange 70 and a discharge hopper 76. A probe 81 is generally located in the discharge hopper 76. The spout of the bulk bag 24 is connected to the discharge connection flange 70. The flexible housing 75 may be made of either a coated fabric or a breathable fabric or of any other suitable flexible material well known in the art. If the discharge connection flange 70 was fixed, the spout of the bag 24 could wrinkle and cause an interruption in flow as the platform 16 inclines. Upright supports 17 hold the top support straps of the bag in place. A linear displacement mechanism 33 is used to incline the platform 16.

Figure 18:
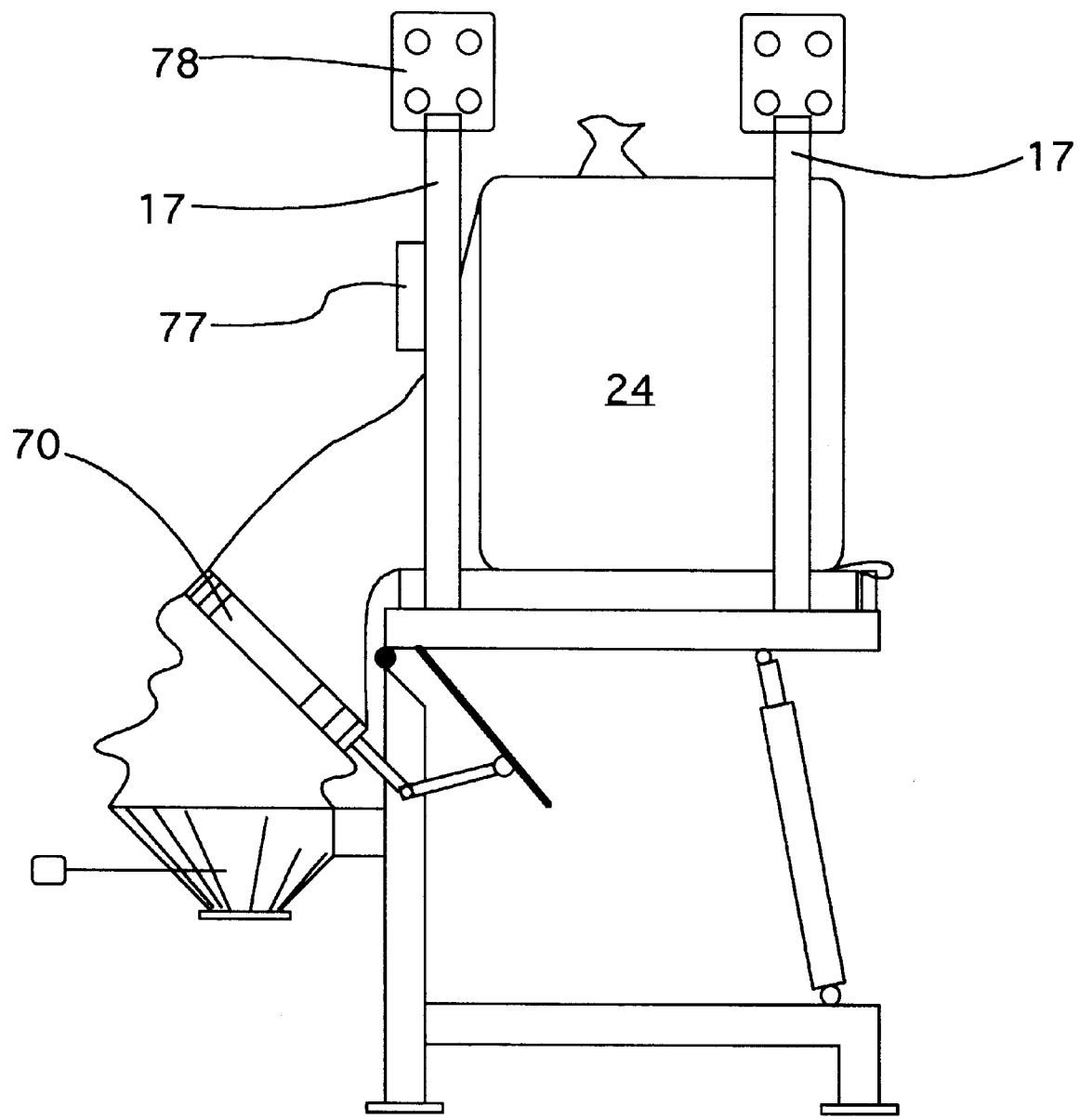
FIG. 18 is a side view of an unloader arrangement with a front support bar.
Figure 19:
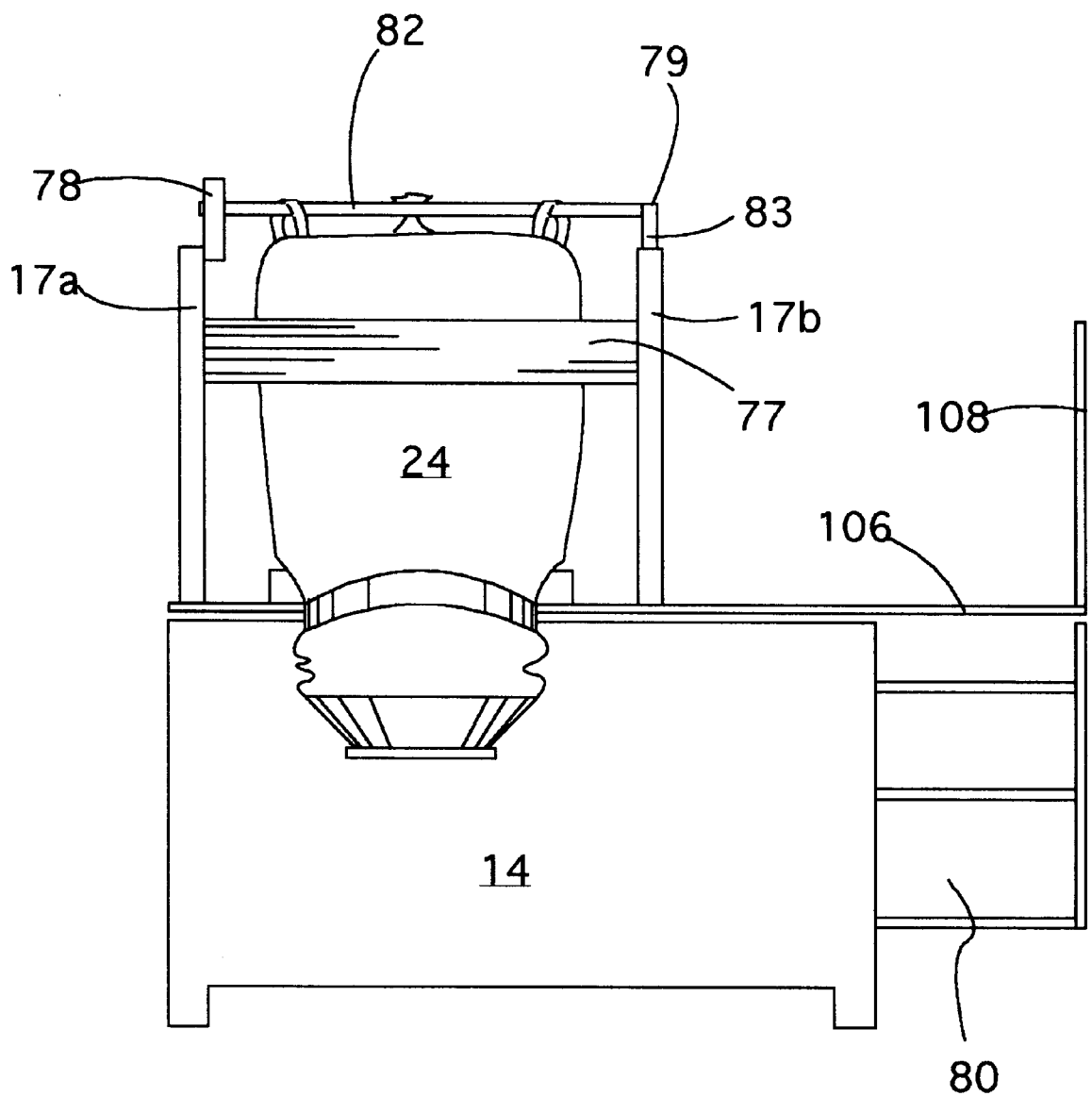
FIG. 19 is a front view of an unloader arrangement with a front support bar.

FIGS. 18–19 show the use of a front support bar 77 attached to the front upright support posts 17a and 17b. This component is helpful in supporting the bag 24 and material inside during the dumping operation. The front support bar may be of any size and may be adjustable and removable. For some applications, as soon as the spout of the bag 24 is connected to the discharge connection flange 70, the platform 16 may be inclined to its maximum angle position. In this configuration, a level sensor and automatic control of the incline action would not be necessary because the material inside the bag 24 would simply all flow out by gravity. The front support bar 77 would help support the load of material in the bag 24. Typically, this use would normally involve free-flowing material only.

Located at the top of the vertical support posts 17a opposite the operator platform 106 side are adjustable plates 78 that have a series of holes to provide a variety of placement options for inserting bag support bar 82 from an operator platform 106 side of the unloader. Vertical support posts on the operator platform 106 side 17b are equipped to be easily adjustable up and down. The end of sliding posts 83 are equipped with locking ends to hold bag support bars 82 securely in place. This design ensures that the bag support bars are locked in place so that the bag is secured during the discharge operation.

The unloader frame 14 may be equipped with an operator platform 106, ladder 80 and safety guard rail 108 in one embodiment.

MASSAGE ARM SYSTEM

Figure 20:
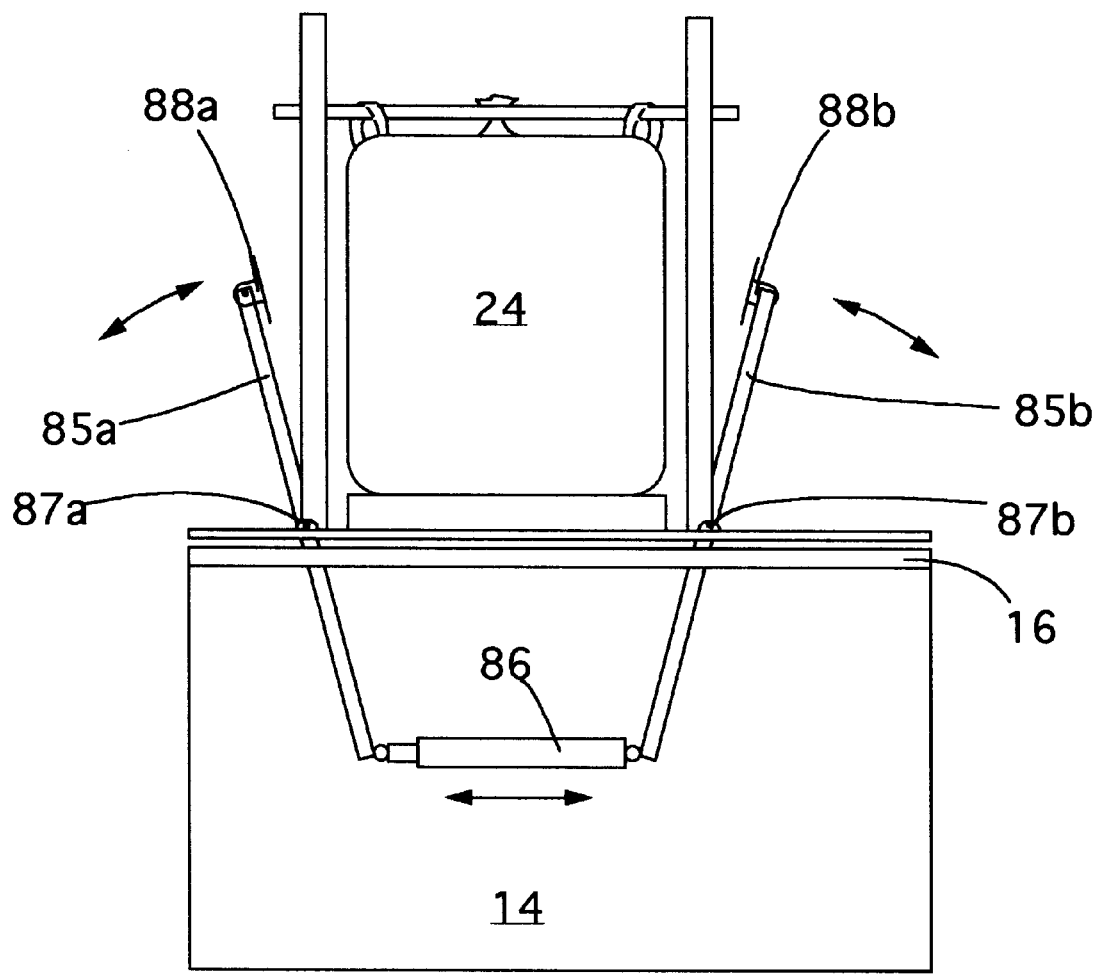
FIG. 20 is a front view of an unloader arrangement with massage arms or paddles.
Figure 21:
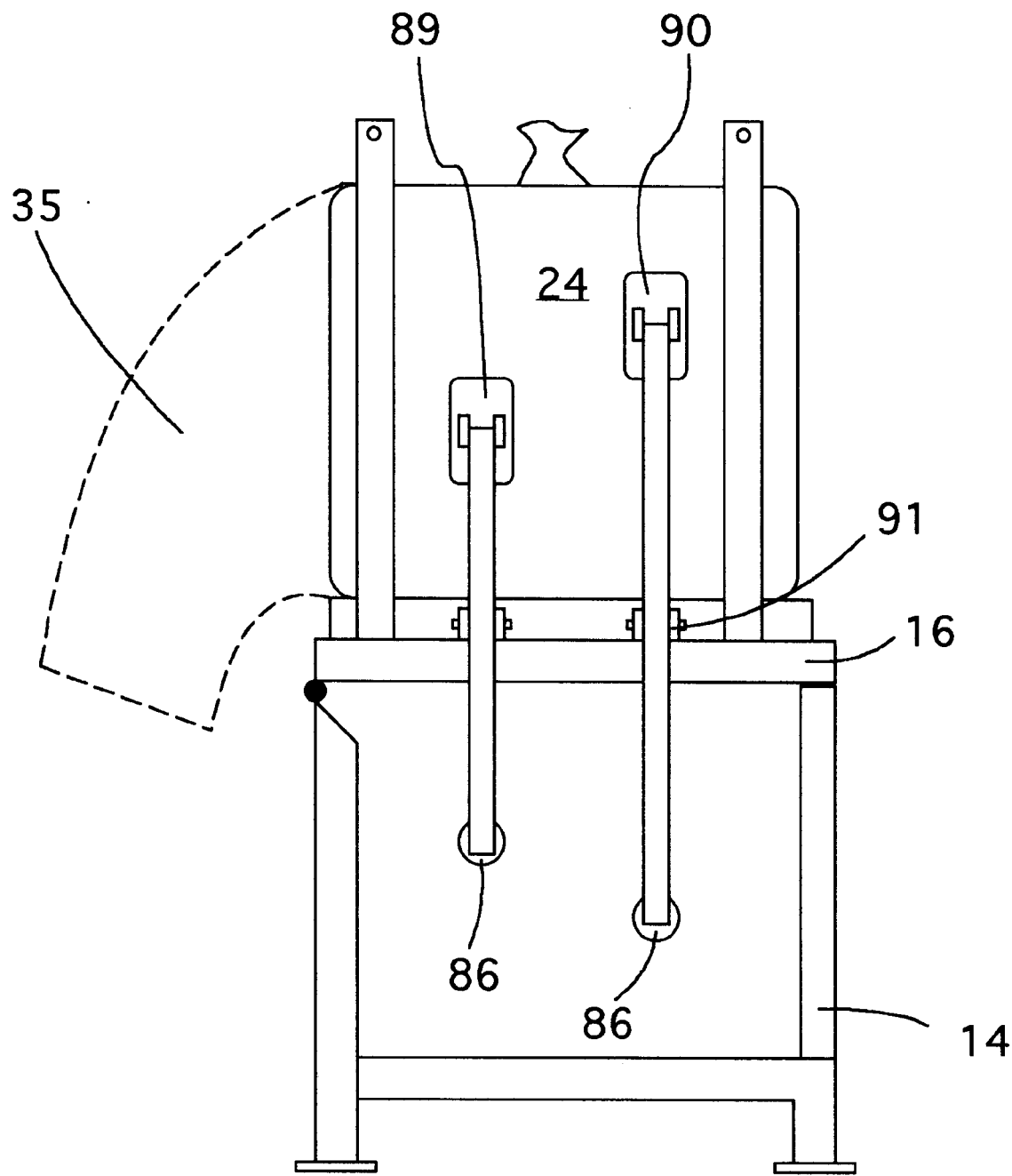
FIG. 21 is a side view of an unloader arrangement with two sets of massage arms.
Figure 22:
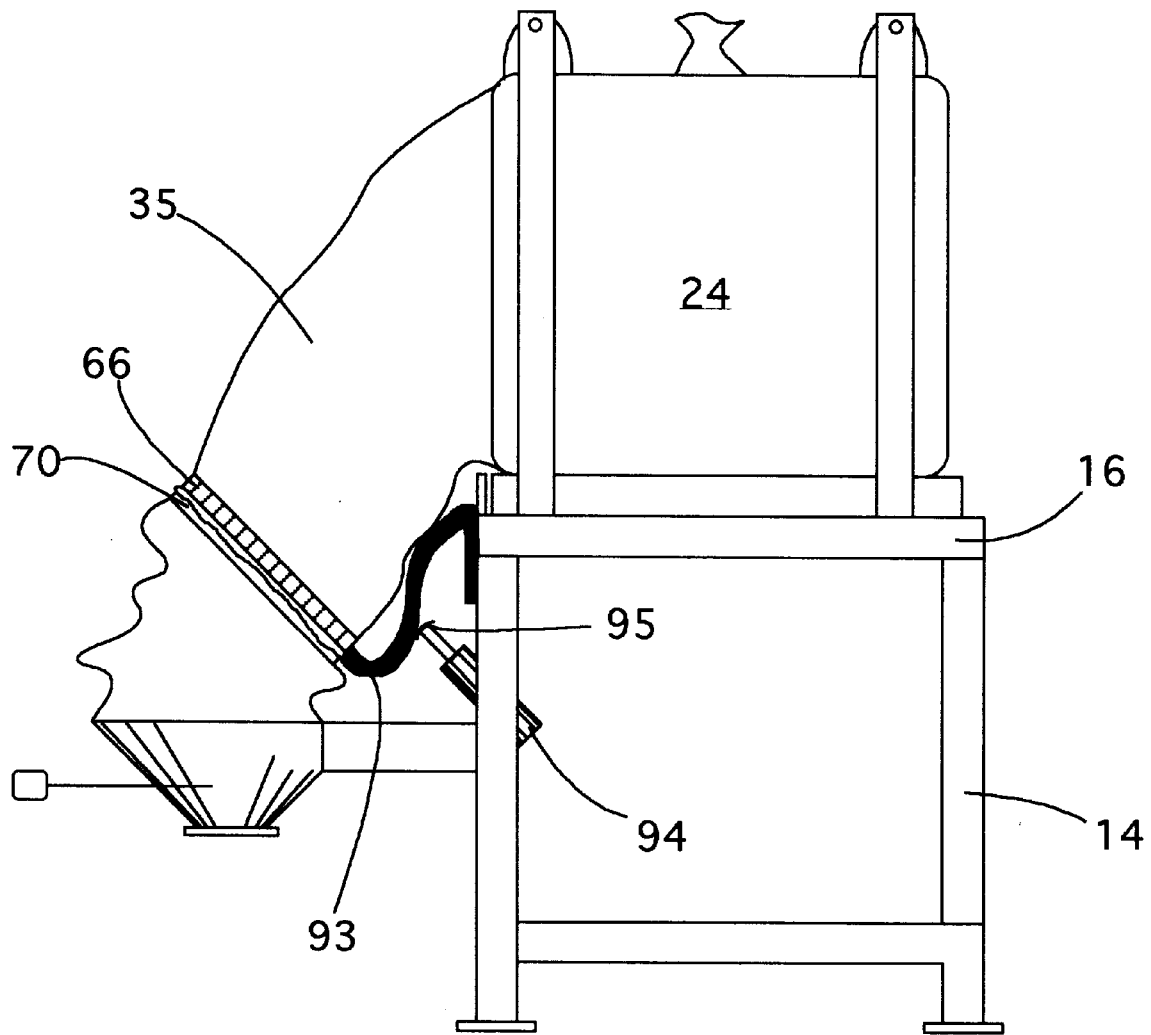
FIG. 22 is a side view of the discharge mechanism manipulated with an end paddle and hydraulic cylinder.

FIGS. 20–22 refer to how any unloader embodiment can be provided with a variety of mechanical massage arm and paddle systems to help break up caked material so that it will flow out of the bag 24.

FIG. 20 is a front view of the unloader embodiment illustrating this feature. Massage arms 85a and 85b pivot and are mounted to the platform 16 by mounting brackets 87a and 87b. At the top end of massage arms 85a and 85b are located paddles 88a and 88b. Because many bulk materials bridge, cake, compact and generally react differently from one another, a variety of paddle designs may be used. Also, the paddles may be mounted rigidly or be allowed to rotate slightly and move as they come in contact with the bag 24.

A linear displacement mechanism 86 is mounted at the bottom of massage arms 85a and 85b. The size, placement and number of massage arms may differ according to each application. The goal is to have the massage arm system help break up caked and compacted material in the bag so that is can be discharged more efficiently. As the linear displacement mechanism extends and causes one arm/paddle to come in contact with the bag first, no pressure will be applied until the second arm also comes into contact. This scissor type action equalizes the effect of the paddle system so that the bag is not pushed to one side or another. Independently operated massage paddles could cause operating problems by pushing from one side only and not providing equal pressure on both sides at once.

FIG. 21 shows the side view of an unloader embodiment illustrating this feature. Shown are two massage arm systems 89 and 90. A first massage arm system 89 is positioned lower while a second massage arm system 90 is positioned higher. While a number of placement options may be available, this placement for two systems is preferred when the shorter paddle system 89 is positioned towards discharge spout 92 side of the bag 24. Mounting brackets 91 can be mounted directly to the platform 16.

FIG. 22 is a side view of the discharge spout 35 section of the bag. A flexible pan 93 may be used to provide support to the discharge spout 35 of the bag during discharge. A linear displacement mechanism 94 with an end paddle 95 may be used to agitate the discharge spout 35 of the bag to induce material flow. The flexible pan 93 will also prove helpful when a poly liner is employed with a bulk material container with or without the discharge spout 35. There will be applications where a poly liner defines the primary spout when the bulk material container is a rigid bin or gaylord container and not a bag. The flexible pan 93 is very useful whether the linear displacement mechanism 94 is operated automatically or manually. It can be operated on a timed sequence, only when required, or be activated by another sensor or switch. The spout 35 is connected to the discharge connection flange 70 by securing a bag clamp ring 66 around exterior of discharge spout 35 of the bag 24.

I claim:

1. An unloading apparatus for unloading bulk material containers having a side-mounted discharge mechanism comprising a substantially flat support platform having a front end and a back end opposite the front end, at least one front vertical support post secured to the support platform near the front end and at least one back vertical support post secured to the support platform near the back end for removably securing a bulk material container onto the support platform such that the container discharge mechanism is near the front end, a substantially rigid frame capable of supporting the support platform, support posts, and container, at least one cable restraint post secured near the back end of the platform, a restraint cable limit switch mechanism that is activated when a restraint cable to secure a bulk material container to the platform is secured to the cable restraint post, and an unloading mechanism for unloading the bulk material containers through the side-mounted discharge mechanism.

2. The unloading apparatus of claim 1 further comprising a hinge secured to the front end of the support platform and the frame.

3. The unloading apparatus of claim 1 further comprising a material conveying mechanism secured to the frame, the material conveying mechanism having a hopper assembly secured to a conveyor inlet and a conveyor motor.

4. The unloading apparatus of claim 3 wherein the material conveying mechanism is taken from a group consisting of screw feeders, belt conveyors, and bucket conveyors.

5. An unloading apparatus for unloading bulk material containers having a side-mounted discharge mechanism comprising a substantially flat support platform means having a front end and a back end opposite the front end, at least one front vertical support post means secured to the support platform means near the front end and at least one back vertical support post means secured to the support platform means near the back end for removably securing a bulk material container onto the support platform means such that the container discharge mechanism is near the front end, a substantially rigid frame means for supporting the support platform means, support post means, and container, at least one cable restraint post means secured near the back end of the support platform means, a restraint cable limit switch means that is activated when a cable restraint means to secure a bulk material container to the support platform means is secured to the cable restraint post means, and an unloading means for unloading the bulk material containers through the side-mounted discharge mechanism.

6. An unloading apparatus for unloading bulk material containers having a side-mounted discharge mechanism and cable restraint loops secured to the containers on a side opposite the side-mounted discharge mechanism comprising a substantially flat support platform having a front end and a back end opposite the front end, at least one front vertical support post secured to the support platform near the front end and at least one back vertical support post secured to the support platform near the back end for removably securing a bulk material container onto the support platform such that the container discharge mechanism is near the front end, a substantially rigid frame capable of supporting the support platform, support posts, and container, a first restraint cable having a first and second end affixed at the first end to the platform, a first coupling ring removably attached to the second end of the first restraint cable, a second restraint cable removably attached to the coupling ring, and removably attached to a cable restraint loop on the container, at least one cable restraint post secured near the back end of the platform, a second coupling ring removably secured to the cable restraint post, a restraint cable limit switch that is activated when the second restraint cable is secured to the cable restraint post, and an unloading mechanism for unloading the bulk material containers through the side-mounted discharge mechanism.

* * * * *